(12) United States Patent
Shah et al.

(10) Patent No.: US 7,725,438 B1
(45) Date of Patent: May 25, 2010

(54) METHOD AND APPARATUS FOR EFFICIENTLY CREATING BACKUP FILES

(75) Inventors: Sunil Shah, Fremont, CA (US); Kirk L. Searls, Maitland, FL (US)

(73) Assignee: Veritas Operating Corporation, Mountain View, CA (US)

( * ) Notice: Subject to any disclaimer, the term of this patent is extended or adjusted under 35 U.S.C. 154(b) by 336 days.

(21) Appl. No.: 11/047,139

(22) Filed: Jan. 31, 2005

(51) Int. Cl.
*G06F 17/30* (2006.01)
(52) U.S. Cl. ............... 707/646; 707/647; 707/653
(58) Field of Classification Search .......... 707/204, 707/205, 200, 102; 709/250; 710/5
See application file for complete search history.

(56) References Cited

U.S. PATENT DOCUMENTS

| | | | |
|---|---|---|---|
| 5,850,566 A * | 12/1998 | Solan et al. ............ 710/5 |
| 6,675,177 B1 * | 1/2004 | Webb ............... 707/200 |
| 6,757,794 B2 * | 6/2004 | Cabrera et al. ......... 711/156 |
| 7,152,069 B1 * | 12/2006 | Santry et al. .......... 707/100 |
| 2005/0071392 A1 * | 3/2005 | Sandorfi et al. ........ 707/204 |
| 2006/0064444 A1 * | 3/2006 | van Ingen et al. ....... 707/204 |

OTHER PUBLICATIONS

SEPATON Sales Literature, copyright 2004, 4 pages.

* cited by examiner

*Primary Examiner*—John R. Cottingham
*Assistant Examiner*—Sherief Badawi
(74) *Attorney, Agent, or Firm*—Moser IP Law Group

(57) ABSTRACT

A method and apparatus for creating backup files by creating an overhead segment for each file that is to be backed up and creating a data segment containing the data that is to be backed up for each file. After creating overhead segment and the data segment, the overhead segment is placed into an overhead stream and the data segment is stored in a memory. The overhead segment is also positioned in the overhead stream with a pointer that identifies the location of the data within the memory. As such, the backup file comprises a data segment and an overhead stream.

12 Claims, 5 Drawing Sheets

400

500

600

METHOD AND APPARATUS FOR EFFICIENTLY CREATING BACKUP FILES

BACKGROUND OF THE INVENTION

1. Field of the Invention

This application contains subject matter that is related to the subject matter of co-pending U.S. patent application Ser. No. 11/048,458, filed Jan. 31, 2005. The aforementioned related patent application is herein incorporated by reference.

The present invention is generally related to backup storage systems and, more particularly, to a method and apparatus for efficiently generating backup files.

2. Description of the Related Art

To provide data redundancy and security within a computer network, information stored in a server connected to the network is backed up to a storage system on a periodic basis. Generally, a plurality of servers are connected to a backup server. The backup server serves as a primary component in a storage management system whereby timing and control of the backup processes are performed by the backup server. Periodically, information stored in the servers is copied to the backup server. The backup server generally stores the information within a mass storage system or device.

Backup files typically utilize the MICROSOFT Tape Format (MTF). To prepare a file using this format, the backup software retrieves each file that is to be backed up and adds header information. The header information is appended to the beginning of the file along with security information to form an overhead portion of a backup file. Each file to be backed up is added to the backup file with its associated overhead portion until all of the files have their overhead and the file concatenated into the backup file. Such a backup file is provided with an extension entitled. "bkf".

When a set of files is backed up in this matter, the set of files in the .bkf file is referred to as a backup set. Upon the initialization of a backup process, the first backup set is generally a full backup that copies each and every file that is to be backed up into the backup file. Thereafter, incremental backups can be performed to backup only files that are changed with respect to the full backup. These incremental file backups occur on a periodic basis. Each incremental backup creates another backup set. Over time, the backup server will store the full backup as well as each of the incremental backups.

A synthetic full backup can be created using a full backup and subsequent incremental backups. The synthetic full backup is a file that contains the data of a full backup without actually performing a full backup procedure, i.e., copying all the files of a server. The synthetic full backup is formed by copying the original full backup and all the incremental backups to a new .bkf file. This new .bkf file is the synthetic backup. This file can now be used as a full backup with respect to subsequent incremental backups. The creation of synthetic backups is time consuming and requires a substantial amount of storage to enable the various data copies to be used.

If the data is to be restored to the server that was backed up, a synthetic full backup can be copied to the server to restore all of the data that would have otherwise been lost from a server crash or other malfunction.

Therefore, there is a need in the art for an improved process for generating backup files.

SUMMARY OF THE INVENTION

The present invention is a method of creating backup files for storage in a random access device. The method creates a backup file by creating an overhead segment for each file that is to be backed up and creating a data segment containing the data that is to be backed up for each file. After creating the overhead segment and the data segment, the overhead segment is placed into an overhead stream and the data segment is stored in memory. The overhead segment is also positioned in the overhead stream with a pointer that identifies the data segment within the memory that is associated with the overhead segment. The overhead stream is identified by the .bkf file extension. The data segments can be accessed by accessing the .bkf file and utilizing the pointers to identify the appropriate data segment. For a full backup, all the files are backed up as an overhead stream and data segments. For each incremental backup thereafter, select files that have been changed during the increment are backed up to form additional data segments and an overhead stream (i.e., a new backup set). Upon creation of a synthetic full backup, the overhead streams of the full and incremental backups are combined and the pointers within the new overhead stream are changed to point to the data segments within the memory. The new overhead stream is then saved with the changed pointers to create a synthetic full backup. In this manner, a synthetic full backup is created without copying any of the data files. As such, a synthetic backup is efficiently and rapidly created.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
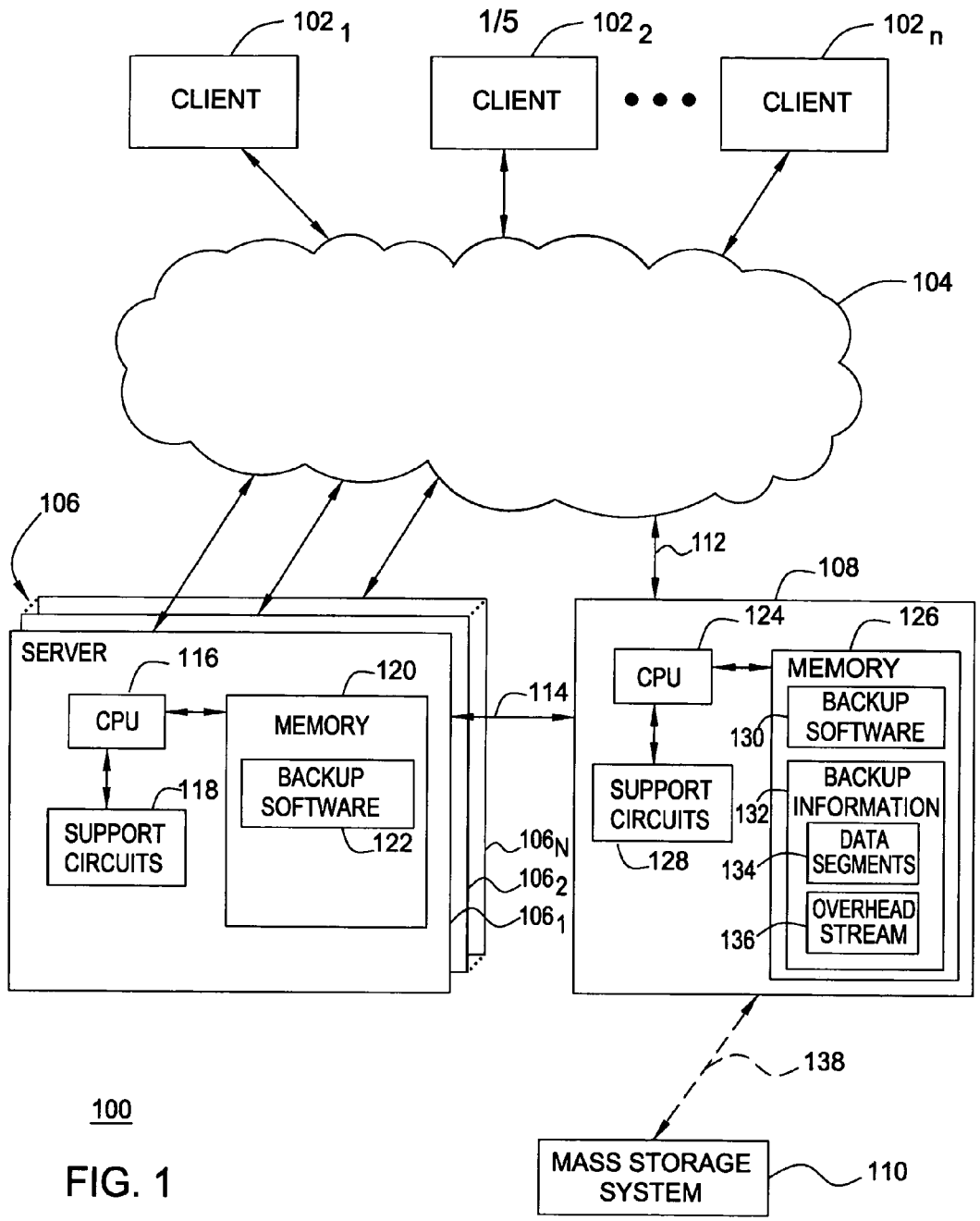
FIG. 1 depicts a block diagram of a computer network that functions in accordance with the present invention.

FIG. 1 is a block diagram of a computer network 100 in which one embodiment of the present invention may be utilized. The computer network comprises a plurality of client computers $102_1, 102_2, \ldots 102_n$ connected to a plurality of servers $106_1, 106_2 \ldots 106_n$ (collectively referred to as servers 106) via a network 104. The servers 106 are connected to at least one backup server 108. The connection to the backup server 108 may be through a private network 114 or connected through the public network 104 via connection 112. In some situations, both connections may be used.

In one embodiment of the invention, the backup server 108 is couple to a mass storage system 110 via path 136. Although one backup server 108 and one mass storage system 110 is depicted, those skilled in the art will understand that there may be a plurality of either backup servers or mass storage systems to provide the redundancy for the network. Also, the mass storage system 110 may be part of the backup server, may be external to the backup server, may be remotely located from the backup server, or may be shared by multiple backup servers.

Each server 106 comprises a central processing unit (CPU) 116, support circuits 118 and memory 120. The CPU 116 may be one or more of any readily available microprocessors or microcontrollers. The support circuits 118 are well known support circuits that are used to facilitate operation of the CPU and comprise one or more circuits such as clock circuits, cache, power supplies, input/output circuits, and the like. The memory 120 may be any form of memory for storing software or digital information comprising one or more of random access memory, read only memory, disk drives, optical memory, removable storage, flash memory, and the like. Specific to this invention, the server 106 stores in memory 120 backup software 122 that facilitates a backup of information stored in the memory 120 of at least one server 106 to the backup server 108.

The backup server 108 comprises a central processing unit (CPU) 124, support circuits 128 and memory 126. As with the servers 106, the CPU 124 may be one or more of any readily available microcontrollers or microprocessors. The support circuits 128 comprise well known circuits for support of the operation of the CPU 124. The circuits include one or more clock circuits, cache, input/output circuits, power supplies, and the like. The memory 126 may be any form of digital memory including one or more of random access memory, read only memory, disk drives, optical storage, removable storage, flash memory and the like. The backup server memory 126 generally stores a variety of software including backup software 130 and the backup data 132 from at least one server 106. The backup data 132 contains at least one data segment 134 and an overhead stream 136. The backup information 132 may be stored within the backup server either temporarily or more permanently depending upon the type of backup server involved, i.e., whether the backup server operates in write-through or write-back mode. The backup information 132 may be stored in a mass storage system 110 for archival purposes. The mass storage system 110 may be any form of bulk storage including optical storage, RAID storage, and the like. To facilitate operation of the invention, the backup information, whether stored in the backup server or in the mass storage system, is stored in a random access device.

In operation, server 106 will support the functionality of the client computers 102 to provide data and software for utilization by the client computers 102 through the network 104. Occasionally, the backup software 122 will be triggered to backup some or all of the data and other information within memory 120 of the server 106. The backup software 130 within the backup server 108 periodically communicates with the backup software 122 within the various servers 106. The data and other information within memory 120 of the server 106 are moved to the memory 126 within the backup server 108. This backup information may be held temporarily in cache before being moved to the mass storage system 110 (i.e., write-back mode), or the backup information 132 may pass directly through the backup server to the mass storage system 110 (i.e., write-through mode).

Figure 2:
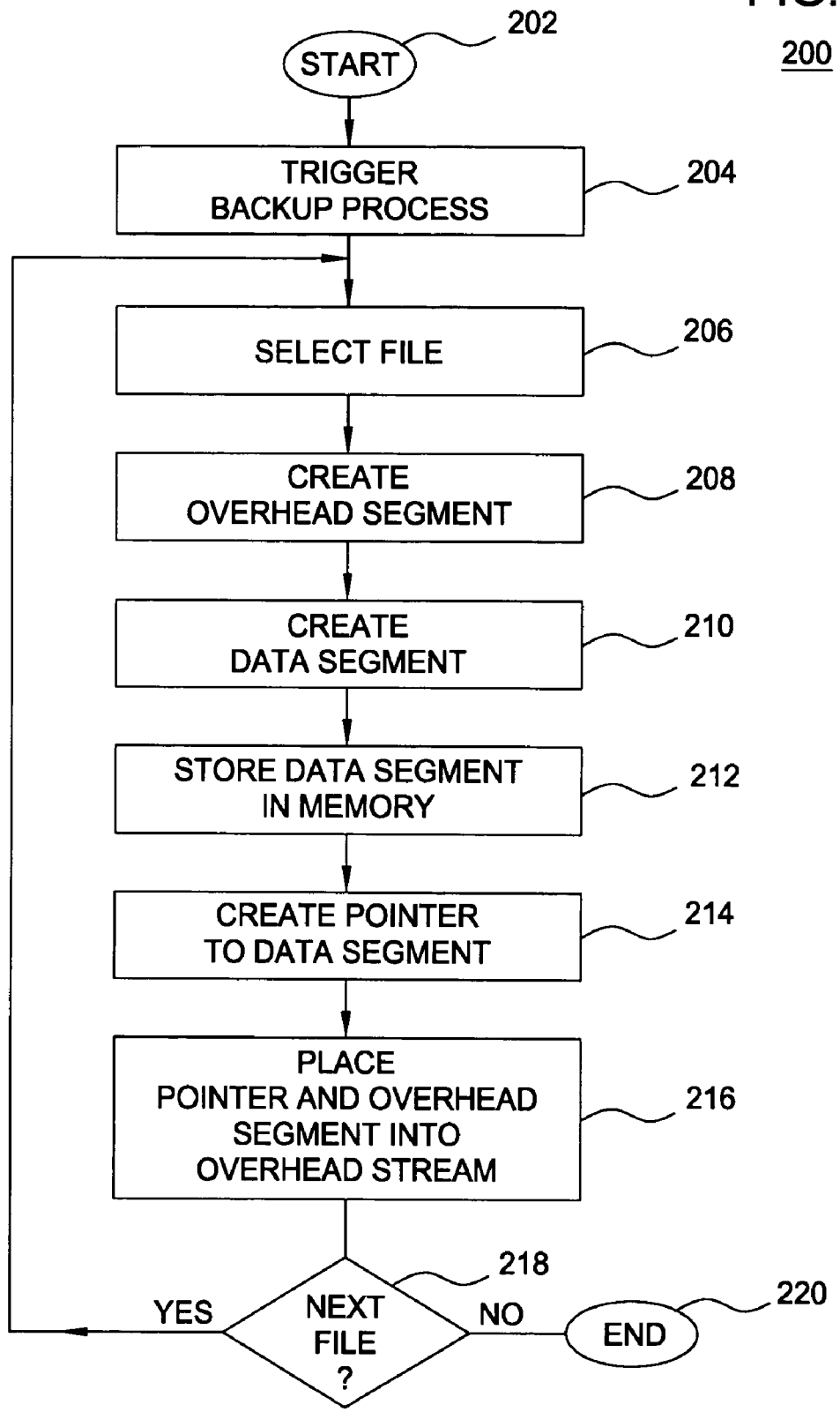
FIG. 2 depicts a flow diagram of a process for generating a backup file in accordance with the present invention.

FIG. 2 depicts a method 200 of creating the backup information 132 containing a data stream 134 and an overhead stream 136. The method 200 begins at step 202 and proceeds to step 204, where the backup process is triggered. At step 206, a file is selected for backup. At step 208, an overhead segment is created for the selected file. The overhead segment may contain security information, extended attributes, error correction information and the like.

At step 210, the data segment is created that contains the data from the selected file. At step 212, the data segment is stored in memory. Alternatively, the data segments can be placed into a data stream. The data stream comprises a concatenated set of data segments from each selected file.

At step 214, a pointer is created that will identify where the data segment is stored within the memory (or where the data segment is positioned within the data stream). At step 216, the pointer and the overhead segment are placed into an overhead stream. At step 218, the method 200 queries whether a next file should be processed. If the query at step 218 is affirmatively answered, the method 200 continues to step 206 where the next file is processed to create the next data segment. If another file is not to be processed, the query at step 218 is negatively answered and the method 200 ends at step 220. In this manner, each data file to be backed up is formed into a data segment and an overhead stream. The overhead stream contains the overhead information and a pointer to the data segments that are associated with each of the overhead segments. The overhead stream is given a ".bkf" extension.

Figure 3:
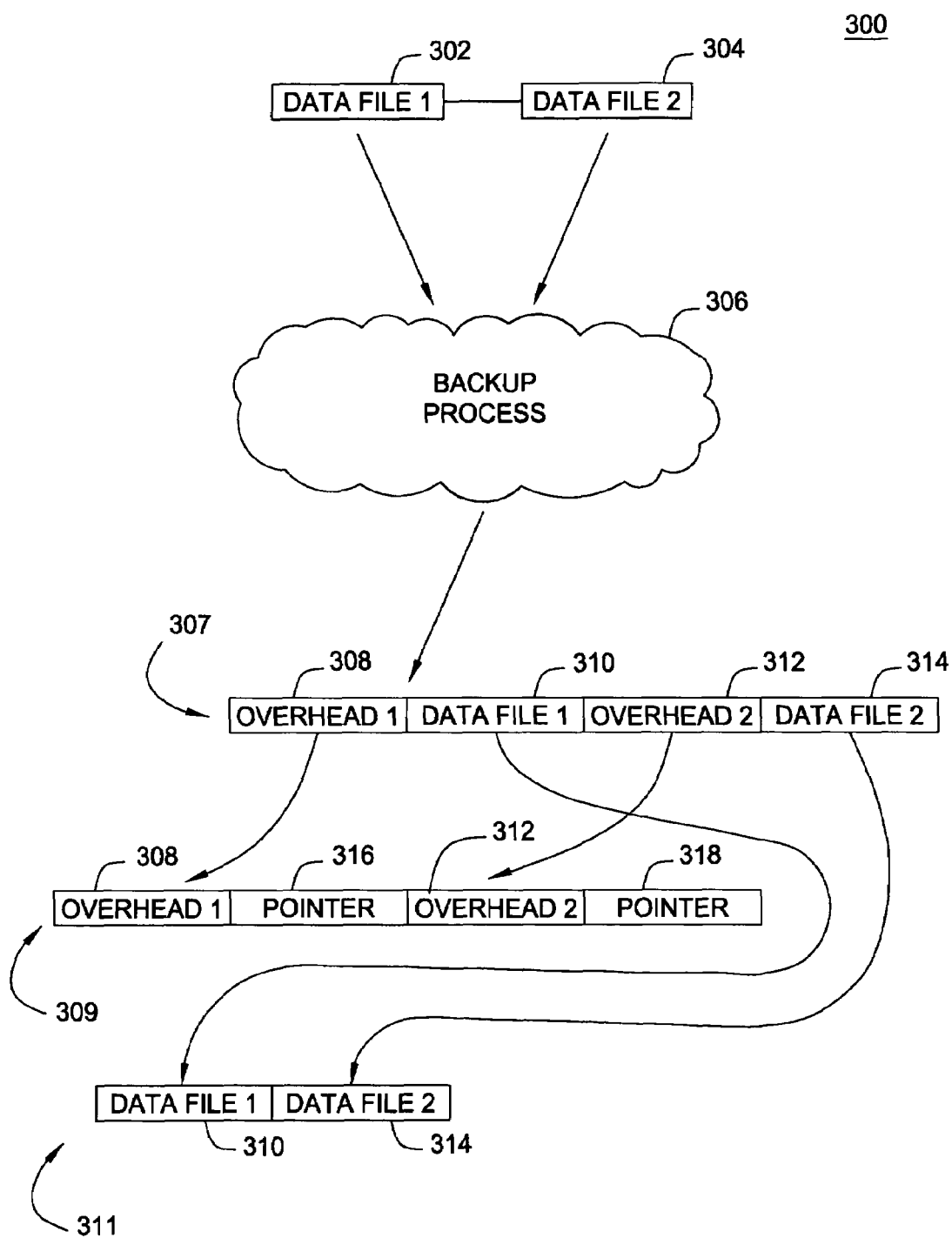
FIG. 3 depicts a schematic view of the process for creating a backup file in accordance with the present invention.

FIG. 3 depicts a schematic view 300 of process 200 described in FIG. 2. Data file 302 and data file 304 are to be backed up by backup process 306. The data files are attached to overhead information that generally would be placed before each data file in a single stream that complies with the MTF protocol. Stream 307 depicts a typical prior art, MTF backup file stream comprising overhead segments interleaved with data file segments to form the stream. In the prior art, this stream forms a .bkf file. In the present invention, the overhead segments are placed into a separate stream 309, i.e., the overhead stream containing the overhead segments 308 and 312 as well as pointers 316 and 318. The data files 310 and 314 are placed into a separate stream 311 that forms the data stream 311. Alternatively, the data files can be stored at memory addresses without being concatenated into a "stream". The overhead stream pointers 316 and 318 identify where in the data stream 311 (or in memory) the data segments 310 and 314 are located. The overhead stream 309 is accorded the .bkf file extension.

The use of a separate overhead stream and separate data segments enables a number of special services to be provided within a backup system. One such service enables a synthetic full backup to be created without copying any of the data segments. A synthetic full backup generally contains within one file all of the information that is required to be backed up from a server. The present invention creates a synthetic full backup without copying the data files.

Figure 4:
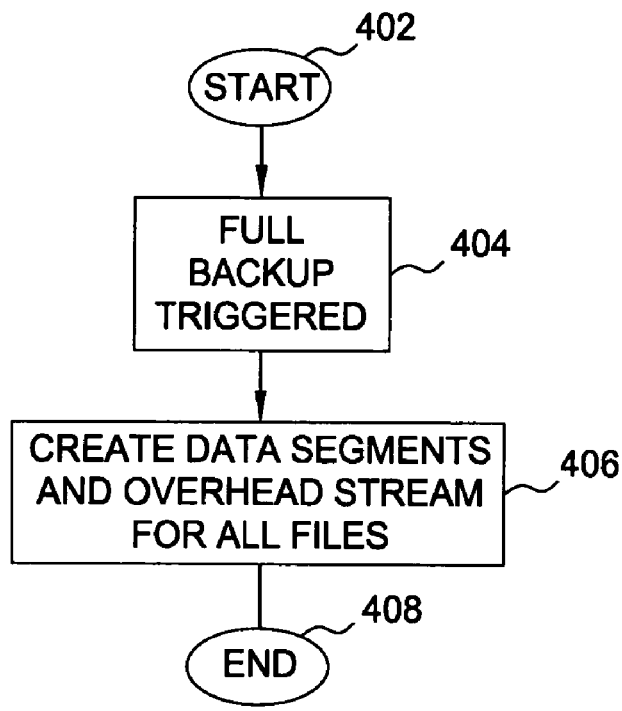
FIG. 4 depicts a flow diagram of a full backup process that is performed in accordance with the present invention.

FIG. 4 depicts a method 400 of creating a full backup using the present invention. Method 400 begins at step 402 and proceeds to step 404, where a full backup is triggered. At step 406, the method 400 creates data segments and an overhead stream for all the files to be backed up in accordance with the process of FIG. 2. The method ends at step 408. In this manner, each and every file that is to be backed up within the server is created into data segments and an overhead stream for backup purposes.

Figure 5:
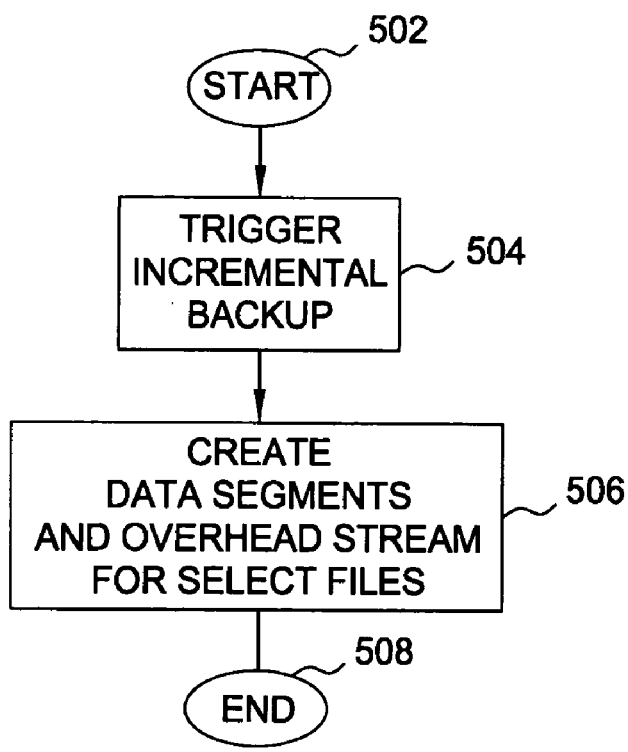
FIG. 5 depicts an incremental backup process that is performed in accordance with the present invention.

FIG. 5 depicts a flow diagram of a method 500 for performing incremental backups. The method 500 begins at step 502 and proceeds to step 504 where the incremental backup is triggered. This trigger generally occurs on a periodic basis, but may occur at other instances e.g., manual user trigger, a periodic triggering, dynamic triggering based on a degree of data change, and the like. At step 506, the method 500 creates data segments and an overhead stream for select files in accordance with the method of FIG. 2. The method ends at step 508. In this manner, each of the files that are selected for backup on an incremental basis are formed into an overhead stream and data segments, i.e., a backup set. Generally, the files are selected based upon whether they had any changes, additions or were otherwise modified since the full backup occurred, or since a prior incremental backup occurred.

Figure 6:
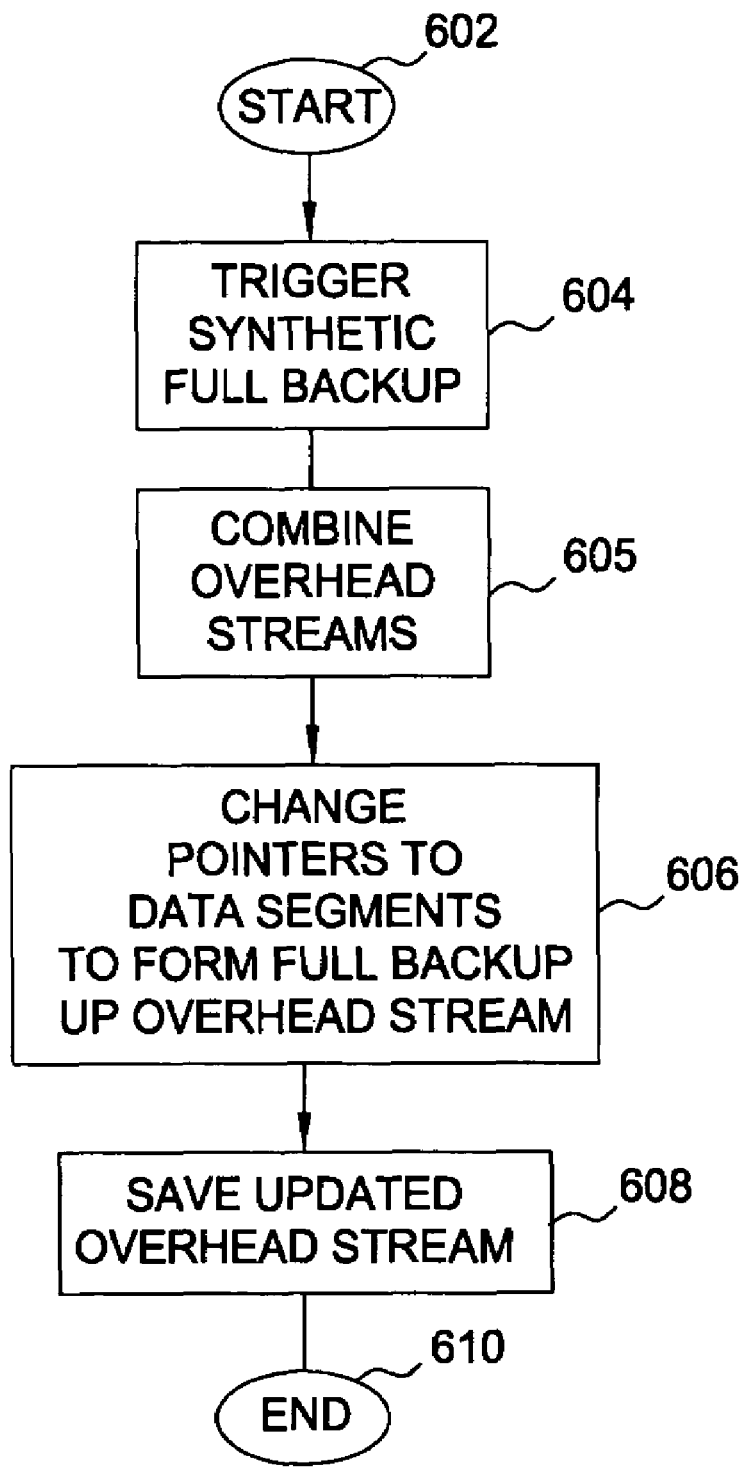
FIG. 6 depicts a flow diagram of a method of creating a synthetic full backup in accordance with the present invention.

FIG. 6 depicts a flow diagram of method 600 for creating a synthetic full backup in accordance with the present invention. The process begins at step 602 and proceeds to step 604, where a synthetic full backup is triggered. At step 605, the overhead streams of the prior full and incremental backups are combined to form a single, new overhead stream. At step 606, the pointers within the new overhead stream are changed to identify the location of the data segments without making any copies of the data. At step 608, the updated overhead stream is saved. And at step 610 the process ends. In this manner, a backup file containing an overhead stream and data segments is created without copying any of the data that was stored during the full and incremental backups. Only the pointers have been changed to identify the location of the data in the memory. Thus, a synthetic full backup can be created rapidly and with computational efficiency.

While the foregoing is directed to embodiments of the present invention, other and further embodiments of the invention may be devised without departing from the basic scope thereof, and the scope thereof is determined by the claims that follow.

The invention claimed is:

1. A method of creating a synthetic full backup of at least one file, the method comprising: creating a full backup at a first time, wherein creating the full backup comprises:
   (a) creating a first overhead segment and a first data segment for the at least one file;
   (b) Storing the first data segment at a first location in memory;
   (c) Creating a first pointer that identifies the first location;
   (d) Placing the first overhead segment and the first pointer into a first overhead stream; and
   (e) storing the first overhead stream at a second location in memory, whereby the overhead segment and the data segment are stored independently of each other; Creating an incremental backup at a second time, wherein creating the incremental backup comprises:
   (a) creating a second overhead segment and a second data segment for the at least one file;
   (b) storing the second data segment at a third location in memory;
   (c) creating a second pointer that identifies the third location;
   (d) Placing the second overhead segment and the second pointer into a second overhead stream; and
   (e) storing the second overhead at a fourth location in memory, whereby the second overhead segment and the second data segment are stored independently of each other; and combining the first and second overhead so as to form a third overhead, wherein the third overhead comprises at least one third pointer, and wherein the at least one third pointer comprises an altered version of at least one of the first and second pointers.

2. The method of claim 1 wherein the data segment is placed in a data stream.

3. The method of claim 1 wherein the data segment comprises data from a file.

4. The method of claim 1 wherein the data segment is stored as a separate, individual file in memory and the pointer identifies a memory location for the data segment.

5. The method of claim 1 wherein the overhead segment comprises at least one of security information, error correction information and extended attributes.

6. An apparatus for creating a backup of at least one file, the segment comprising; a processor and memory, wherein:
   creating a full backup at a first time, wherein creating the full backup comprises:
   (a) creating a first overhead segment and a first data segment for the at least one file;
   (b) Storing the first data segment at a first location in memory;
   (c) Creating a first pointer that identifies the first location;
   (d) Placing the first overhead segment and the first pointer into a first overhead stream; and
   (e) storing the first overhead stream at a second location in memory, whereby the overhead segment and the data segment are stored independently of each other, Creating an incremental backup at a second time, wherein creating the incremental backup comprises:
   (a) creating a second overhead segment and a second data segment for the at least one file;
   (b) storing the second data segment at a third location in memory;
   (c) creating a second pointer that identifies the third location;
   (d) Placing the second overhead segment and the second pointer into a second overhead stream; and
   (e) storing the second overhead at a fourth location in memory, whereby the second overhead segment and the second data segment are stored independently of each other; and combining the first and second overhead so as to form a third overhead, wherein the third overhead comprises at least one third pointer, and wherein the at least one third pointer comprises an altered version of at least one of the first and second pointers.

7. The apparatus of claim 6 wherein the data segment comprises data from a file.

8. The apparatus of claim 6 wherein the data segment is stored as a separate, individual file in memory and the pointer identifies a memory location for the data segment.

9. The apparatus of claim 6 wherein the data segment is placed in a data stream.

10. The apparatus of claim 6 wherein the overhead segment comprises at least one of security information, error correction information and extended attributes.

11. The apparatus of claim 6 wherein the processor creates a full backup and creates an incremental backup for select files.

12. The apparatus of claim 11 wherein the processor creates a synthetic full backup by altering the pointers in the full and incremental backups.

* * * * *